United States Patent [19]

Wataya et al.

[11] Patent Number: 4,694,806
[45] Date of Patent: Sep. 22, 1987

[54] FUEL CONTROL APPARATUS FOR ENGINE

[75] Inventors: Seiji Wataya; Setsuhiro Shimomura; Yukinobu Nishimura, all of Himeji, Japan

[73] Assignee: Mitsubishi Denki Kabushiki Kaisha, Japan

[21] Appl. No.: 897,334

[22] Filed: Aug. 18, 1986

[30] Foreign Application Priority Data

Aug. 20, 1985 [JP] Japan .................................. 60-182701

[51] Int. Cl.⁴ ................................................. F02B 3/00
[52] U.S. Cl. .................................... 123/494; 73/118.2; 123/488
[58] Field of Search ........................ 123/494, 488, 480; 73/118.2; 364/431.05

[56] References Cited

U.S. PATENT DOCUMENTS

| | | | |
|---|---|---|---|
| 3,818,877 | 6/1974 | Barrera | 123/494 |
| 4,112,879 | 9/1978 | Assenheimer et al. | 123/480 |
| 4,377,145 | 3/1983 | Nagaishi | 123/494 |
| 4,404,846 | 9/1983 | Yamauchi et al. | 73/118 |
| 4,527,530 | 7/1985 | Abe | 123/494 |
| 4,555,937 | 12/1985 | Sumal | 73/118 |
| 4,612,895 | 9/1986 | Kuroiwa | 123/494 |

FOREIGN PATENT DOCUMENTS

| | | | |
|---|---|---|---|
| 154509 | 9/1985 | European Pat. Off. | 123/494 |
| 3230829 | 2/1984 | Fed. Rep. of Germany | 123/494 |
| 2301693 | 9/1976 | France | 123/494 |

Primary Examiner—Ronald B. Cox
Attorney, Agent, or Firm—Leydig, Voit & Mayer

[57] ABSTRACT

A fuel control apparatus for an engine has an atmospheric pressure sensor for detecting the atmospheric pressure in the vicinity of the engine, and is constructed to correct the upper limit value of the intaken air amount preset in response to the operating characteristic of the engine in the operating range of the engine which does not exhibit the true value of the intaken air amount by the detected output of the air flow sensor due to the reverse-flow effect of the intaken air of the engine.

5 Claims, 10 Drawing Figures

FUEL CONTROL APPARATUS FOR ENGINE

BACKGROUND OF THE INVENTION

This invention relates to a fuel control apparatus for an engine in a vehicle for burning fuel at an optimum air-fuel ratio.

FIG. 1 shows a prior-art fuel control apparatus for an engine. In FIG. 1, numeral 1 designates an engine, numeral 2 an intake manifold, numeral 3 a fuel injection valve mounted in the intake manifold 2 to surround the vicinity of the intake port of the engine 1, numeral 4 a surge tank of intake air pressure provided between the intake manifold 3 and an intake conduit 5, numeral 6 a throttle valve provided in the intake conduit 5, and numeral 7 an air flow sensor provided near the upstream end of the intake conduit 5 and provided, for example to be disposed in a ring-shaped air duct. The air flow sensor 7 is an air flow rate measuring instrument for measuring, on the basis of a heat dissipating principle, the weight, the temperature and the density of the intake air and provides the same as output data. Numeral 8 indicates a controller which calculates and decides the optimum fuel injection amount in accordance with the output of a rotary sensor 9 for detecting the rotating speed of the engine 1 and the output of the air flow sensor 7.

The controller 8 is composed, as shown in FIG. 6, of a computer. More specifically, numeral 81 designates an analog/digital converter (hereinafter referred to as "an A/D converter") for converting the analog output of the air flow sensor 7 into a digital signal convenient for calculation processing, numeral 82 an interface circuit for inputting the digital output of the rotary sensor 9, numeral 83 a microprocessor (hereinafter referred to as "a CPU") for calculating an optimum fuel supply amount in accordance with the outputs of the A/D converter 81 and the interface circuit 82, numeral 84 a memory (hereinafter referred to as "a RAM") for temporarily storing various data (including the abovementioned outputs) used at the calculating time, numeral 85 a memory (hereinafter referred to as "a ROM") for storing data such as calculating sequence, and numeral 86 an amplifier for amplifying a fuel supply amount signal outputted from the microprocessor 83. Next, the operation will be described.

When the engine 1 is operated in the operating state except the vicinity of full open (WOT) of the throttle valve 6, the output from the air flow sensor 7 becomes a waveform which includes a normal ripple as shown by a curve (a) in FIG. 7. When the area covered by the waveform is calculated, the true intake air weight can be obtained. Thus, when the microprocessor 83 controls the drive pulse width of the fuel injection valve 3 in accordance with the value produced by dividing the intake air amount by the rotating speed of the engine, it can provide a desired air-fuel ratio.

However, in an engine having less than four cylinders, the output waveform of the air flow sensor 7 becomes as shown by a curve (b) in FIG. 7 due to the reverse-flow effect from the engine 1 in the special rotating speed range (generally in a range of 1000 to 3000 r.p.m.) near the WOT, and the area indicated by the hatched portion is excessively added to the true intaken air weight.

This is due to the fact that the hot-wire type air flow sensor 7 detects and outputs as the intaken air amount irrespective of the air flowing direction.

The detecting error of the sensor 7 by the reverse-flow depends, as shown in FIG. 8, upon the rotating speed of the engine, and normally occurs from when the vacuum in the intake conduit is near −50 mmHg and becomes 50% at the maximum in the WOT range.

When the fuel supply amount is calculated and injected with respect to a value which contains such a large error, the air-fuel ratio becomes very rich, the combustion in the engine becomes unstable, thereby becoming impossible to practically use. Heretofore, as shown in FIG. 9, the upper limit value (designated by a broken line) is set in the maximum air amount determined for the engine in the area a that the error occurs by the blow-by, and stored in the ROM 85, and the detected value of the air flow sensor 7 exceeding this limit value is clipped by the upper limit value as shown by (b) in FIG. 7, thereby suppressing the excessively dense air-fuel ratio.

Since the prior-art fuel control apparatus for the engine is composed as described above, the upper limit value of the intake air amount must be set to match the intake air amount characteristic of the engine to be countermeasured on a low height ground level (i.e., low altitude), and the upper limit value must become the upper limit of the mass flow rate on the low height ground level.

However, if the engine is operated, for example, with a high load on a high height ground level (i.e., high altitude) with low atmospheric pressure, the output level of the air flow sensor 7 does not reach the average value at the predetermined upper limit value as shown by (c) in FIG. 7 due to the reduction in the air density. Thus, the average value of the output level which contains the reverse-flow is used in the calculation of fuel as it is, with the result that the air-fuel ratio is shifted to the rich side. Therefore, the air-fuel ratio varies with respect to the atmospheric pressure as shown in FIG. 10. In other words, when the upper limit value of the intake air amount is determined by the atmospheric pressure, there arises a problem that the error of the air-fuel ratio increases as the altitude increases due to the increase in atmospheric pressures.

SUMMARY OF THE INVENTION

This invention has the objective to overcome the disadvantage of the prior-art fuel control apparatus as described above, and has for its main object to provide a fuel control apparatus for an engine in which an error of an air-fuel ratio due to the variation in the atmospheric pressure is removed to obtain a stable combustion state for all operating conditions of the engine.

In a fuel control apparatus for an engine according to this invention, the error in the air-fuel ratios due to the differences in atmospheric pressures is corrected by using correction value data for cancelling differences due to the differences in atmospheric pressures, and a fuel injection amount from the fuel injection valve is controlled by the output data calculated by a microprocessor considered with the correction value data. Thus, a stable constant air-fuel ratio can be always obtained irrespective of the variation in the atmospheric pressure, the combustion of mixture gas can be stabilized, and the output of the engine can also be stabilized.

DESCRIPTION OF THE PREFERRED EMBODIMENT

Figure 1:
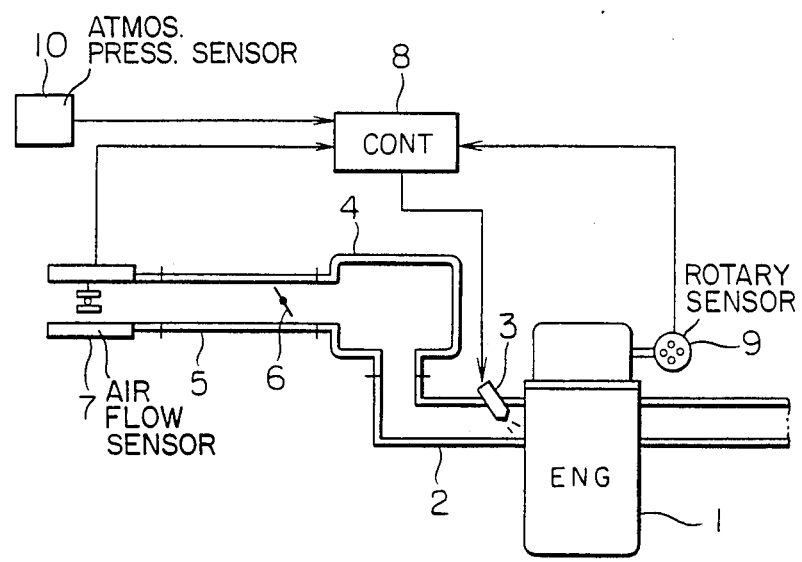
FIG. 1 is a schematic view of the construction of a fuel control apparatus for an engine according to an embodiment of this invention.
Figure 2:
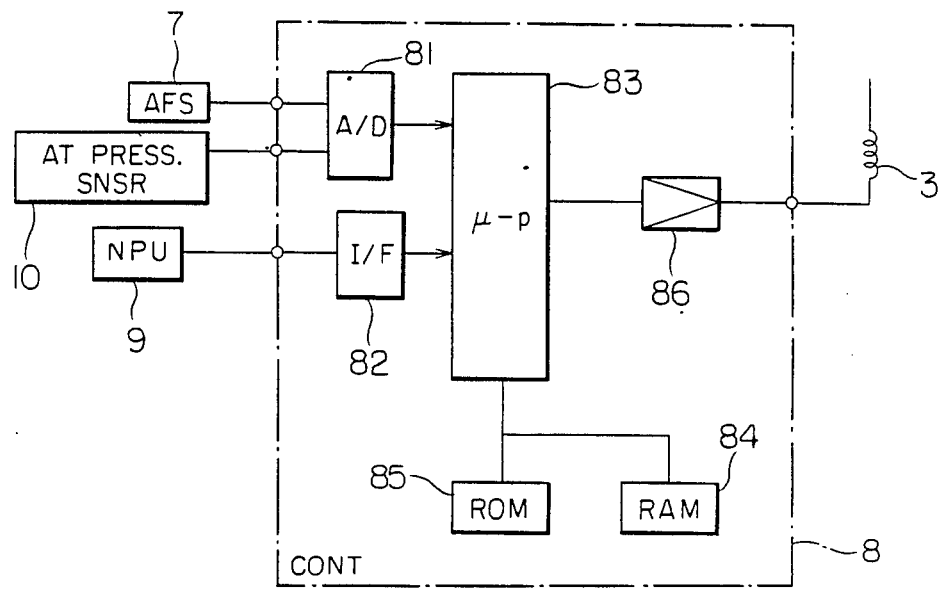
FIG. 2 is a block circuit diagram showing the essential portion of the control apparatus.
Figure 5:
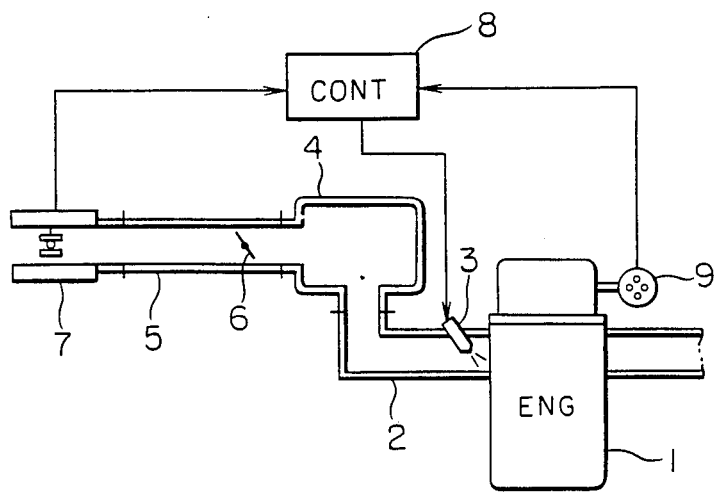
FIG. 5 is a schematic view of the construction of a prior-art fuel supply controller.
Figure 6:
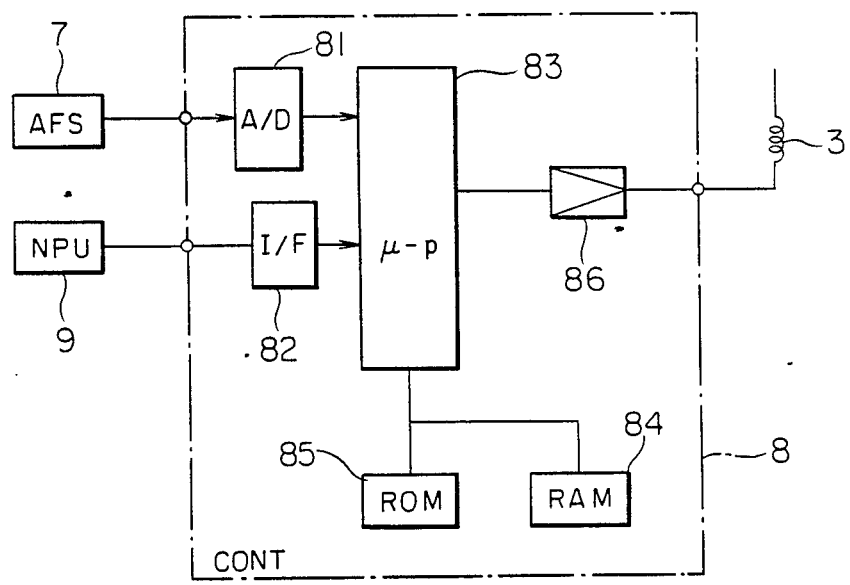
FIG. 6 is a block circuit diagram of the controller in FIG. 5.
Figure 7:
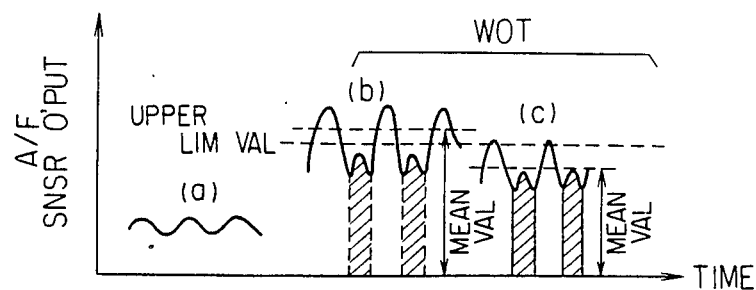
FIG. 7 is a graphical diagram of an air flow sensor.
Figure 8:
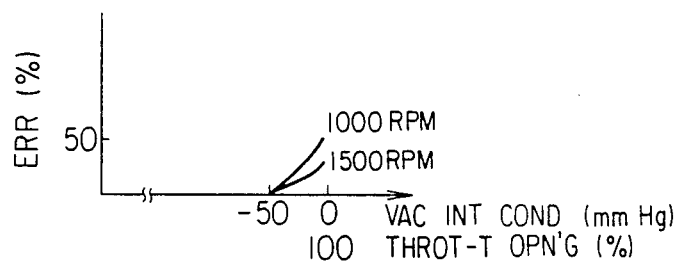
FIG. 8 is a graphical diagram of the detecting error of the air flow sensor.
Figure 9:
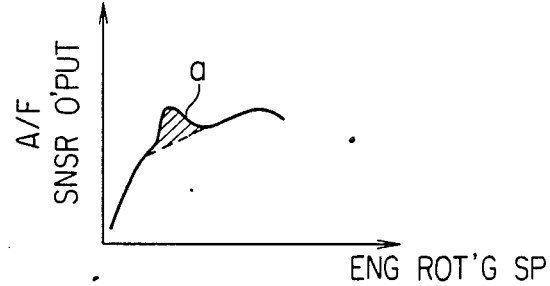
FIG. 9 is a graphical diagram of the output of the air flow sensor versus the rotating speed of the engine.
Figure 10:
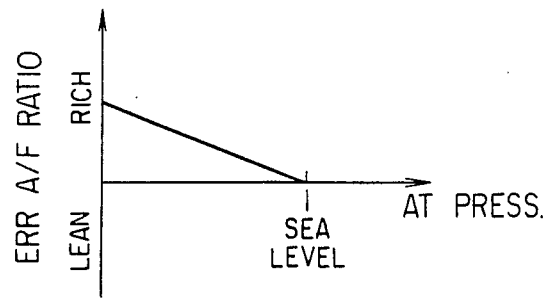
FIG. 10 is a graphical diagram of the error of the air-fuel ratio.

Now, an embodiment of this invention will be described with reference to the drawings. In FIG. 1, numeral 10 designates an atmospheric pressure sensor mounted on a vehicle for detecting the atmospheric pressure in the environment of an engine 1, which is formed, for example, of a semiconductor strain gauge integrally associated with diaphragm means for detecting the variation in the atmospheric pressure. The atmospheric pressure sensor 10 inputs detected atmospheric pressure data to the controller 8. Other elements are equivalent to those shown in FIG. 5, and the corresponding parts are denoted by the same symbols, and will not be repeatedly explained. Next, the operation will be described.

When the engine 1 is operated, the intake air is fed through an air cleaner and the intake conduit 5 into the intake manifold 2, fuel injection valves 3 provided in the intake manifolds 2 of the respective cylinders inject fuel at a predetermined timing to feed mixture gas of preset air-fuel ratio into the combustion chambers of the respective cylinders. At this time, the atmospheric pressure is detected by the atmospheric pressure sensor 10, the output of which is input to the A/D converter 81 in the controller 8, which converts it into a digital signal, which is, in turn, inputted to the microprocessor 83.

Figure 4:
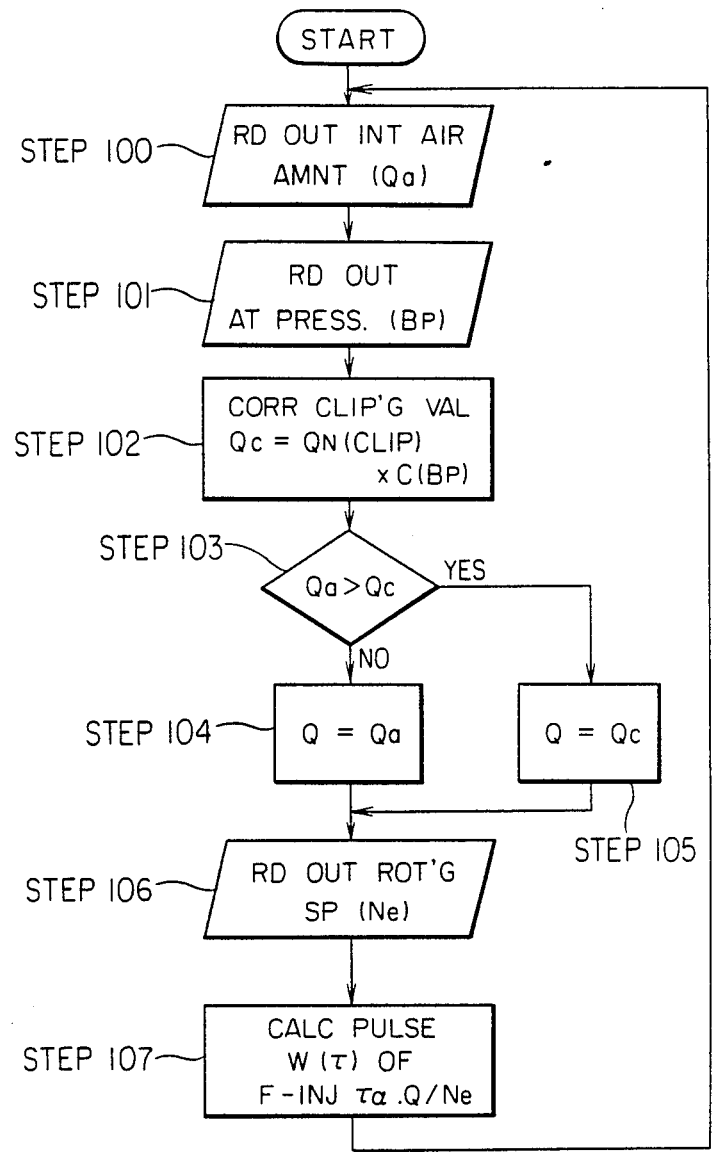
FIG. 4 is a flowchart showing the calculating process by a microprocessor.

Next, the calculating process to be executed by the microprocessor 83 will be described by using the atmospheric pressure data detected as described above in accordance with the flowchart of FIG. 4.

Figure 3:
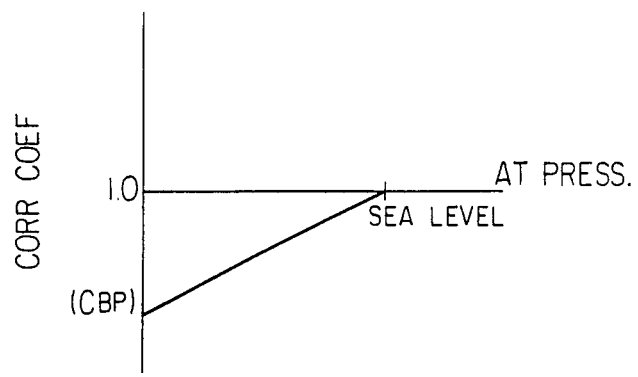
FIG. 3 is a graphical diagram showing an atmospheric pressure correction coefficient used in this invention.

The air flow sensor 7 first reads out the intake air amount Qa in step 100, and the atmospheric pressure sensor 10 then reads out the atmospheric pressure Bp in the environment of the engine 1 in step 101. Then, the atmospheric pressure correction coefficient C (BP) in FIG. 3 set in advance in the memory is multiplied by the clipped value Qu of the intake air amount determined in response to the rotating speed of the engine on the low height ground level to obtain the clipping correction value Qc in step 102. Subsequently, whether the measured intaken air amount Qa is larger than the clipping correction value Qc or not is judged in step 103. In case of $Qa \leq Qc$, $Q=Qa$ is set in step 104, and in case of $Qa > Qc$, $Q=Qc$ is set in step 105. Then, the rotary sensor 9 reads out the rotating speed Ne in step 106, Q/Ne is calculated to provide the data of pulse width $\tau$ of the fuel injection valve 3 in step 107.

Since the upper limit value of the intake air amount is always corrected by the atmospheric pressure by the abovementioned calculating process, the error of the air-fuel ratio due to the difference of the atmospheric pressures on the traveling ground in the operating range near the full open of the throttle valve 6 can be eliminated to stably burn the gas mixture and to perform the stable operation of the engine.

According to this invention as described above, the atmospheric pressure sensor for detecting the atmospheric pressure in the environment of the engine is provided to correct the upper limit value of the intake air amount by the output of the atmospheric pressure sensor in the operating range of the engine that the air flow sensor does not exhibit the true value of the intake air amount. Therefore, a stable air-fuel ratio can be provided irrespective of the altitude at which a vehicle is being operated, and a stable gas mixture and a stable combustion state of the engine can be provided.

What is claimed is:

1. A fuel control apparatus for an engine comprising:
    an air flow sensor for detecting and producing an output representing the intake air amount of the engine,
    a sensor for detecting and producing an output representing the operating state of the engine,
    a controller for calculating and producing an output representing the fuel supply amount in accordance with the output signals of said sensors to determine the optimum value,
    fuel injecting means controlled by the output signal of the controller for injecting fuel to the intake passage of the engine, and
    an atmospheric pressure sensor for detecting the atmospheric pressure,
    wherein said controller in the operating range of the engine where the detected output of said air flow sensor does not exhibit the true value of the intake air amount due to the reverse-flow of the intake air of the engine, sets at least one upper limit value Qn of the intake air amount in response to the operating state of the engine, and wherein said upper limit value is corrected by the atmospheric pressure detected by said atmospheric pressure sensor.

2. A fuel control apparatus for an engine according to claim 1, wherein said air flow sensor is of a hot-wire type air flow sensor.

3. A fuel control apparatus for an engine according to claim 1, wherein a rotary sensor for detecting the rotating speed of the engine is used as said sensor for detecting the operating state of the engine.

4. A fuel control apparatus for an engine according to claim 1, wherein said atmospheric sensor is a semiconductor strain gauge.

5. A fuel control apparatus for an engine according to claim 1, wherein said controller comprises a memory for storing the upper limit value $Q_N$ of the intake air amount set in response to the rotating speed of the engine, means for reading out a correction coefficient C stored in advance in accordance with the output of said atmospheric pressure sensor to multiply it by the upper limit value $Q_N$ of the intake air amount outputted from said memory to produce an upper limit correction value Qc, and means for calculating the optimum fuel supply amount by using an intake air amount Qa when the upper limit correction value Qc is larger than the intaken air amount Qa detected by said air flow sensor and using the upper limit correction value Qc when smaller than the intake air amount Qa.

* * * * *